United States Patent
Juette et al.

(10) Patent No.: US 9,377,612 B2
(45) Date of Patent: Jun. 28, 2016

(54) IR MICROSCOPE WITH IMAGE FIELD CURVATURE COMPENSATION, IN PARTICULAR WITH ADDITIONAL ILLUMINATION OPTIMIZATION

(71) Applicant: Bruker Optik GmbH, Ettlingen (DE)

(72) Inventors: Michael Juette, Karlsruhe (DE); Axel Keens, Karlsruhe (DE)

(73) Assignee: Bruker Optik GmbH, Ettlingen (DE)

( * ) Notice: Subject to any disclaimer, the term of this patent is extended or adjusted under 35 U.S.C. 154(b) by 527 days.

(21) Appl. No.: 13/743,402

(22) Filed: Jan. 17, 2013

(65) Prior Publication Data

US 2013/0188034 A1    Jul. 25, 2013

(30) Foreign Application Priority Data

Jan. 20, 2012  (DE) .......................... 10 2012 200 851

(51) Int. Cl.
*G02B 21/36* (2006.01)
*G02B 21/00* (2006.01)
*G02B 21/04* (2006.01)
(Continued)

(52) U.S. Cl.
CPC .............. *G02B 21/361* (2013.01); *G02B 13/14* (2013.01); *G02B 17/061* (2013.01); *G02B 17/0816* (2013.01); *G02B 21/0004* (2013.01); *G02B 21/0096* (2013.01); *G02B 21/04* (2013.01)

(58) Field of Classification Search
CPC ........ G02B 21/04; G02B 21/18; G02B 21/36; G02B 21/361; G02B 21/0096; G02B 17/06–17/0663; G02B 13/14; G02B 17/0816
USPC ......... 359/350, 351, 363–366, 368, 370, 629, 359/726–731, 850, 857, 858, 859, 861; 348/79; 250/353
See application file for complete search history.

(56) References Cited

U.S. PATENT DOCUMENTS 2,817,270 A * 12/1957 Mandler ........................ 359/730
3,216,308 A * 11/1965 Northcutt ..................... 356/251
(Continued)

FOREIGN PATENT DOCUMENTS

| DE | 100 36 309 | 3/2002 |
|---|---|---|
| DE | 10 2010 004 827 | 9/2010 |
| WO | WO 02/46722 | 6/2002 |

OTHER PUBLICATIONS

Riedl, Max J., "The Mangin Mirror and Its Primary Aberrations," Applied Optics, vol. 13, No. 7, Jul. 1974.*
(Continued)

*Primary Examiner* — Derek S Chapel
*Assistant Examiner* — Adam W Booher
(74) *Attorney, Agent, or Firm* — Paul Vincent

(57) ABSTRACT

An IR microscope (1) is constituted such that, in an optical viewing mode in a beam path of visible light (VIS-R, VIS-T), a first intermediate focus (ZW1) is imaged onto a flat detector surface (15a) of a camera. The IR microscope (1) is constituted such that, in the beam path of the visible light (VIS-R, VIS-T), the first intermediate focus (ZW1) is imaged onto a second intermediate focus (ZW2), and, in the second intermediate focus (ZW2), a Mangin mirror (11) is disposed that corrects a field curvature of the Cassegrain objective (4). The invention provides an IR microscope in which the field curvature generated by the Cassegrain objective is corrected in a simple manner in the optical viewing mode when detection is performed using a flat detector and without restricting the spectral range of the IR microscope.

14 Claims, 2 Drawing Sheets

(51) Int. Cl.
*G02B 13/14* (2006.01)
*G02B 17/06* (2006.01)
*G02B 17/08* (2006.01)

(56) References Cited

U.S. PATENT DOCUMENTS

| | | | | |
|---|---|---|---|---|
| 3,748,015 | A | * 7/1973 | Offner | 359/366 |
| 4,037,934 | A | * 7/1977 | Matsubara | 359/659 |
| 4,101,201 | A | * 7/1978 | Tojyo | 359/661 |
| 4,411,499 | A | 10/1983 | Abel | |
| 4,594,509 | A | 6/1986 | Simon | |
| 4,843,242 | A | * 6/1989 | Doyle | 250/330 |
| 4,852,955 | A | * 8/1989 | Doyle et al. | 359/355 |
| 5,612,816 | A | * 3/1997 | Strahle et al. | 359/376 |
| 6,008,936 | A | 12/1999 | Simon | |
| 2008/0049304 | A1 | 2/2008 | Deck | |
| 2011/0248166 | A1 | 10/2011 | Diem | |

OTHER PUBLICATIONS

Smith, Warren J., Modern Optical Engineering, 3rd Edition, McGraw-Hill, 2000, Chapter Twelve, p. 427.*
Muetze, Karl et al., "ABC der Optik", Hanau/Main : Dausien, 1961, Pa. 829-833.
Haferkorn, H. "Optik: Physikalisch-technische Grundlagen und Anwendungen", Frankfurt/M., Deutsch, 1981, Pa. 607-608. ISBN 3-87144-570-3.
Bruker Optik GmbH "Hyperion Series: FT-IR Microscopes", Ettlingen, 2009, (BOPT-091109-1), Firmenschrift.
Wilson, R.N. "Corrector Systems for Cassegrain Telescopes", In: Applied Optics, 7, 1968, 2, Pa. 253-263.

* cited by examiner

IR MICROSCOPE WITH IMAGE FIELD CURVATURE COMPENSATION, IN PARTICULAR WITH ADDITIONAL ILLUMINATION OPTIMIZATION

This application claims Paris convention priority of DE 10 2012 200 851.9 filed Jan. 20, 2012, the entire disclosure of which is hereby incorporated by reference.

BACKGROUND OF THE INVENTION

The invention relates to an infrared (=IR) microscope, with a beam path for visible light and a beam path for IR light, wherein the beam paths are coextensive in the region of a sample position, of a Cassegrain objective, and of a first intermediate focus,
wherein the Cassegrain objective images the sample position onto the first intermediate focus,
and wherein the IR microscope is constituted in such a way as to direct IR light from the first intermediate focus to an IR detector at least in an IR viewing mode, and to image the first intermediate focus onto a flat viewing surface, in particular a flat detector surface of a camera, in the beam path of the visible light at least in an optical viewing mode.

Such an IR microscope is known from the company publication "HYPERION Series" of Bruker Optik GmbH, Ettlingen, DE, 2009.

Analytical information about a sample can be obtained by means of infrared (IR) spectroscopy. The chemical bonds in the sample absorb or reflect IR light depending on the wavelength of the IR light.

In an IR microscope, the analytical information can be obtained specifically for a certain location or a certain region of the sample. Preferably, both a beam path for visible light and a beam path for IR light are set up in an IR microscope. Because the beam path for the visible light and the beam path for the IR light are largely coextensive, the location or region of the sample from which the analytical information is to be obtained by IR light can be visualized.

To examine the sample in the IR microscope, the sample is imaged onto an intermediate focus. In the intermediate focus, a region of the sample can be selected for examination using an aperture. Imaging of the sample, which should be performed in the same manner in the beam path for visible light and in the beam path for IR light, cannot be achieved with conventional lenses because of their differing refractive properties for visible light and IR light. A Cassegrain objective is usually used to image the sample in which the visible light and the IR light are reflected on two curved (usually spherical) surfaces.

However, the Cassegrain objective results in an aberration in the imaging of the sample, namely field curvature (also known as field of curvature). The imaging of the sample is focused onto a curved surface. If the image is now detected with a flat detector surface (which is the case in all conventional video cameras), the imaging will be sharp in the center but increasingly blurred toward the outer edge.

From EP 0 051 969 A1, use of a Mangin mirror to correct field curvature in IR systems is known. Therein, the IR light is refracted on a front side (for example a germanium surface) of a Mangin mirror, reflected on a rear side, and again refracted on the front side. The Mangin mirror is integrated into a Cassegrain objective. This configuration is complicated; in particular, the Cassegrain objective is then a special component. The spectral range is also limited to the transmission range of the substrate material of the Mangin mirror.

The object of this invention is to provide an IR microscope in which the field curvature is corrected in a simple manner in the optical viewing mode, when detection is performed using a flat detector, without restricting the spectral range of the IR microscope.

SUMMARY OF THE INVENTION

This object is achieved with an IR microscope of the type stated above that is characterized in that the IR microscope is constituted so as to image the first intermediate focus onto a second intermediate focus in the beam path of the visible light, and in that a Mangin mirror, which corrects the field curvature of the Cassegrain objective, is disposed in the second intermediate focus.

According to this invention, a Mangin mirror is used to correct the field curvature. However, the Mangin mirror is not in the Cassegrain objective, i.e. in the common region of the beam paths of the IR light and of the visible light but in a second intermediate focus behind the Cassegrain objective. Within the scope of this invention, only the visible light is directed in the region of this second intermediate focus. This inventively avoids the Mangin mirror restricting the usable spectral range of the IR microscope.

The aberration caused by the Cassegrain objective in the IR microscope is especially noticeable in the imaging of the sample with visible light, with which very much larger regions of the sample can be viewed than with the imaging with IR light. For that reason, correction of the field curvature in the beam path of the visible light only is sufficient in practice. This invention makes use of this.

The visible light is imaged from the first intermediate focus onto the second intermediate focus, and the field curvature of the imaging of the sample on the second intermediate focus is corrected by means of the Mangin mirror. The refractive material of the Mangin mirror can be adjusted to the wavelength of the visible light; in particular, conventional glasses for optical applications can be used.

The refractive material and the geometry of the Mangin mirror, in particular the curvature radii on the front (refracting) surface R1 and on the rear (reflecting) surface R2, are chosen such that the known, or at least easily determined, field curvature of the Cassegrain objective is corrected.

To obtain spatially resolved analytical information over a large range of the sample within the scope of the invention, the sample can be scanned with IR light, and the IR light can be detected with a one-element IR detector; similarly, the IR light can be detected with an IR-sensitive, two-dimensional IR detector (for example, an FPA camera).

An embodiment of the inventive IR microscope is especially preferred in which a curvature radius R1 of a front surface of the Mangin mirror, a curvature radius R2 of a reflective, rear surface of the Mangin mirror, a refractive index n of a refractive material between the two surfaces of the Mangin mirror and a thickness t of the Mangin mirror are chosen such that not only the field curvature is corrected but the image field on the flat viewing surface is also evenly illuminated. According to this embodiment, double optimization, that is, correction of the field curvature and improved illumination, is achieved with a single, very compact optical element, namely the Mangin mirror. Note that the refractivity of the Mangin mirror can be set and optimized in addition to and simultaneously with its Petzval radius because sufficient free parameters exist (even though the refractive index n is fixed and determined by the material). In particular, fine adjustment of the refractivity is possible merely by varying the thickness t.

In an advantageous variant of this embodiment, the Mangin mirror in the beam path of the visible light images an exit pupil of an optical system disposed in front of the Mangin mirror, in particular of an Offner objective, onto an entry pupil of an optical system disposed behind the Mangin mirror, in particular an achromatic lens. This simply and reliably avoids vignetting (shading) of the following optical system. The focal distance of the Mangin mirror required for this can be set via the parameters R1, R2, n, and t.

In another preferred embodiment, a<n/(n−1) applies, where a=R2/R1. This reliably achieves a focusing effect of the Mangin mirror.

An embodiment of the inventive IR microscope is especially preferred which is characterized in that a curvature radius R1 of a front surface of the Mangin mirror, a curvature radius R2 of a reflective, rear surface of the Mangin mirror, and a refractive index n of a refractive material are chosen between the two surfaces of the Mangin mirror such that the Petzval radius $R_{Petzval}$ of the Mangin mirror is at least essentially mirror-inverted with respect to the Petzval radius $R_{Petzval}^{VIS}$ in the beam path for visible light, including the Cassegrain objective and without the Mangin mirror, where $R_{Petzval} = na|R1|/[2a(n-1)+2]$ and $a=R2/R1$, wherein the Cassegrain objective introduces a Petzval radius $R_{Petzval}^{Obj}$ of $-f_{Obj}$ into the Petzval radius $R_{Petzval}^{VIS}$ in the beam path for visible light, wherein $f_{Obj}$ is the focal distance of the Cassegrain objective. With an appropriate Mangin mirror, the field curvature of the Cassegrain objective and, if necessary, further sources of field curvature in the beam path (from the sample to the viewing surface or detector surface of the camera) can be corrected. Further sources are usually only of secondary importance so that good correction is already achieved if the Petzval radius $R_{Petzval}$ of the Mangin mirror is at least essentially mirror-inverted with respect to the Petzval radius $R_{Petzval}^{Obj}$ of the Cassegrain objective.

In a preferred embodiment, $0.5*f_{Obj} \leq |R1| 2*f_{Obj}$, where $f_{Obj}$: focal distance of the Cassegrain objective and R1: curvature radius of a front surface of the Mangin mirror. With this choice of R1, correction of the field curvature can be performed especially easily; this has proven successful in practice.

In another, advantageous embodiment, an Offner objective is disposed in the beam path of the visible light between the first intermediate focus and the second intermediate focus. This enables the second intermediate focus to be set up practically without any aberration.

An embodiment is also preferred in which a beam splitter is provided in the beam path of the visible light to divide the light incident upon and reflected by the Mangin mirror. By using the beam splitter, the incident and reflected beam can easily be directed together (parallel) at the Mangin mirror so that astigmatism and distortion are avoided.

In another, preferred embodiment, the IR microscope is constituted for reflection and/or transmission operation. This invention can be used well both in reflection operation and in transmission operation.

In an advantageous embodiment, an interferometer is provided that is integrated into the housing of the IR microscope. This achieves a compact configuration. In particular, the interferometer can be integrated into the IR source. Alternatively, an external interferometer that is not integrated into the housing of the IR microscope can be used. The interferometer can be constituted as a pendulum interferometer.

An embodiment is preferred in which a lens system, in particular comprising two achromatic lenses, is provided to image the second intermediate focus onto the flat viewing surface. Imaging using the lens system is especially simple, in particular as compared with reflecting optical systems. With the achromatic lenses, a chromatic aberration can be avoided.

In a further, preferred embodiment, a variable aperture for IR light is disposed on the first intermediate focus. In this way, a certain portion of the image can be selected for infrared measurement. The variable aperture can preferably be moved transversely with respect to the beam path in two independent directions; in particular, motorized scanning is possible. If a one-element detector is used as the IR detector, spatially resolved information can be obtained without moving the IR detector.

Further advantages result from the description and the drawing. Moreover, the features stated above and further features stated below can be used singly or together in any combination according to the invention. The embodiments shown and described are not intended to be an exhaustive list but are rather examples to explain the invention.

The invention is shown in the drawing and is explained in more detail based on the examples. The figures show:

DESCRIPTION OF THE PREFERRED EMBODIMENT

Figure 1:
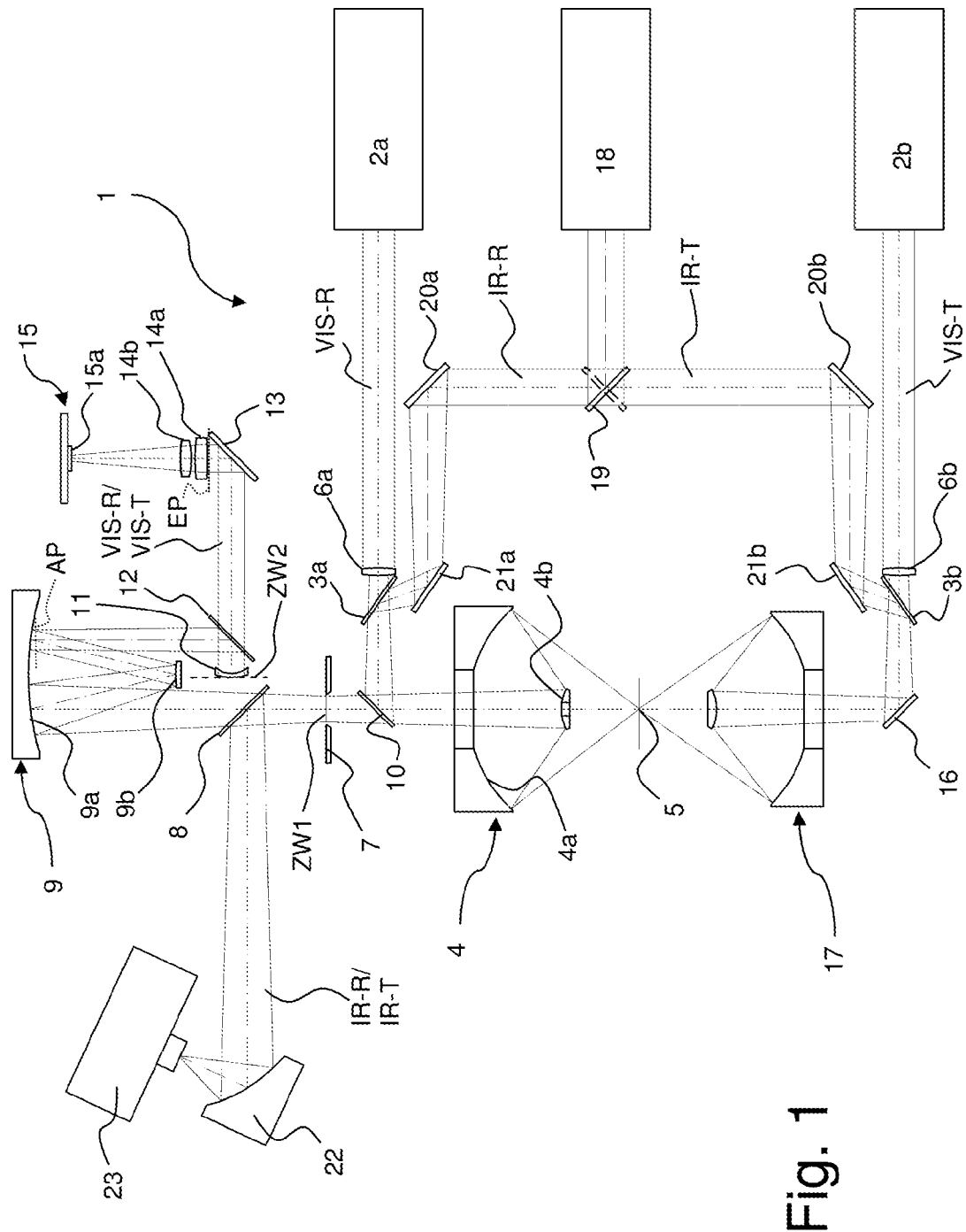
FIG. 1 a schematic representation of an inventive IR microscope.

FIG. 1 shows a schematic overview of an embodiment of an inventive IR microscope 1. The IR microscope 1 can be used both in reflection operation ("front lighting") and in transmission operation ("back lighting").

In reflection operation in optical viewing mode, visible light (see beam path VIS-R) is directed from a source 2a of visible light (for example, an incandescent bulb) via a lens 6a, a beam splitter 3a, a beam splitter 10, and a Cassegrain objective 4 onto a sample position 5, at which a sample to be examined is disposed. The Cassegrain objective 4 comprises two reflective surfaces 4a, 4b; in this case, the convex surface 4b and the concave surface 4a are each spherically curved.

The visible light reflected from the sample position 5 is imaged onto a first intermediate focus ZW1 via the Cassegrain objective 4 through the beam splitter 10, wherein the Cassegrain objective 4 introduces a field curvature aberration. In the plane of the first intermediate focus ZW1, an aperture 7 (variable in this case) is disposed that is transparent for visible light but not for IR light.

The image of the sample is then imaged onto a second intermediate focus ZW2 through a further beam splitter 8, by means of an Offner objective 9 comprising two reflecting surfaces 9a, 9b, and through a further beam splitter 12. A Mangin mirror 11 is disposed in the second intermediate focus ZW2. The Mangin mirror 11 has a front, curved surface (with curvature radius R1) and a rear, reflective, also curved surface (with curvature radius R2) and consists of a refractive material with a refractive index n for visible light (for details of the Mangin mirror 11, cf. FIG. 2). The double refraction of the visible light on the front surface and the reflection on the rear surface corrects the field curvature introduced into the imaging of the sample by the Cassegrain objective 4.

The sample image in the second intermediate focus ZW2 or on the Mangin mirror 11 is imaged via a mirror 13 with two achromatic lenses 14a, 14b on a flat detector surface 15a of a camera 15 (2 D detector for visible light). The image of the sample detected there no longer exhibits perceptible field curvature.

To achieve good illumination of the detector surface 15a (in particular in the edge regions of the image of the sample), the Mangin mirror 11 is constituted such that an exit pupil AP of the optical system in front of the Mangin mirror 11, that is, of the Offner objective 9 (in this case immediately behind the primary mirror 9a), is imaged onto the entrance pupil EP of the optical system behind the Mangin mirror, that is, of the front achromatic lens 14a (immediately behind the latter in this case).

In transmission operation in optical viewing mode (here), a further source 2b of visible light is used. The visible light emitted by it (cf. beam path VIS-T) is directed via a lens 6b, a beam splitter 3b, a mirror 16, and a further Cassegrain objective 17 onto the sample position 5, wherein the further Cassegrain objective 17 is located opposite the Cassegrain objective 4.

The visible light passing through the sample at the sample position 5 is imaged by means of the Cassegrain objective 4 through the beam splitter 10 onto the first intermediate focus ZW1, whereby again a field curvature aberration is introduced; otherwise the beam path of the visible light is the same as in reflection operation.

In reflection operation in IR viewing mode, the IR light (cf. beam path IR-R) from an infrared source 18, which is coupled to an interferometer (not depicted), is imaged onto the sample position 5 via a movable mirror 19, two further mirrors 20a, 21a, the beam splitter 3a, and the beam splitter 10 with the Cassegrain objective 4.

The IR light reflected by the sample position 5 is imaged onto the first intermediate focus ZW1 via the Cassegrain objective 4 and through the beam splitter 10. In this case, too, a field curvature aberration is introduced by the Cassegrain objective 4.

At the first intermediate focus ZW1, a partial region of the image of the sample is selected for the further beam path IR-R with the aperture 7 which is opaque for IR light (and has a variable diameter and a position that is adjustable transversely with respect to the beam path in two independent directions).

From the first intermediate focus ZW1, the IR light is focused via the beam splitter 8 onto a curved mirror 22, which focuses the IR light onto an IR detector 23. The field curvature in beam path IR-R is not corrected (in this case), but this is also not necessary because the portion of the sample selected with the aperture 7 is usually small. (Alternately, correction of the field curvature can be provided in the beam path for IR light in an analogous way to correction in the beam path of the visible light, see above).

Note that the beam paths VIS-R and IR-R between beam splitter 3a and beam splitter 8 are coextensive (parallel); the sample can be illuminated and examined with visible light and IR light simultaneously or successively.

In transmission operation in IR viewing mode, the light emitted by the infrared source 18, cf. beam path IR-T, is directed via the mirror 19 (rotated through 90° with respect to reflection operation), the further mirrors 20b, 21b, the beam splitter 3b, and the mirror 16 via the Cassegrain objective 17 onto the sample position 5.

The IR light having passed through the sample is imaged via the Cassegrain objective 4 and through the beam splitter 10 onto the first intermediate focus ZW1; otherwise, the beam path of the IR light is the same as in reflection operation.

Note that the beam paths VIS-T and IR-T between beam splitter 3b and beam splitter 8 are coextensive (parallel); the sample can be illuminated and examined with visible light and IR light simultaneously or successively.

Figure 2:
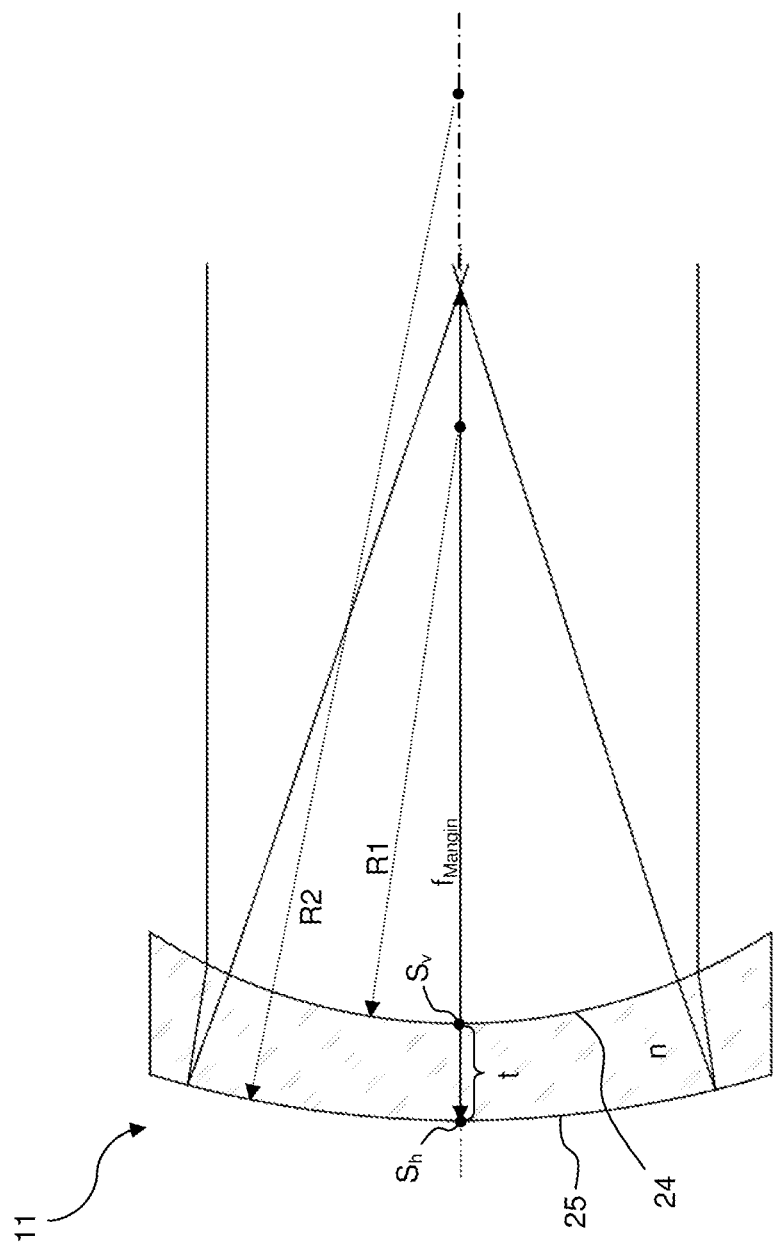
FIG. 2 a schematic representation of a Mangin mirror as used for the invention.

FIG. 2 shows a Mangin mirror 11, as can be used within the scope of the invention, in a schematic cross-section. The Mangin mirror 11 has a front, circularly curved surface 24 with curvature radius R1 and a rear, reflective, circularly curved surface 25 with curvature radius R2; the material of the Mangin mirror has a refractive index n; n is typically in the range from 1.3 to 2.2 for visible light in the range 400 nm to 800 nm. (The environment typically has a refractive index of 1.0.) The material of the Mangin mirror 11 can, for example, be glass.

Incident light (a parallel beam in this case) is refracted on the front surface 24, reflected on the rear surface 25, and again refracted on the front surface 24. The light is then focused at a focal point at a distance corresponding to the focal distance $f_{Mangin}$ of the Mangin mirror 11. The focal distance $f_{Mangin}$ depends on the thickness t of the Mangin mirror 11, measured between the apexes $S_v$ and $S_h$ of the surfaces 24, 25.

There follows an explanation of how a Mangin mirror 11 according to the invention is chosen and used.

Basic Idea of the Invention

A Cassegrain objective, as is typically used in an infrared microscope, consists of two concentric, spherical mirrors. Because of this configuration, it is very well corrected (i.e. it is aplanatic, anastigmatic, achromatic, and free of distortion), but it exhibits a field curvature, a so-called Petzval radius of $-f_{Obj}$, if $f_{Obj}$ is the focal distance of the objective.

Typical focal distances of infrared microscope objectives are in the range 5 to 30 mm. For an overview image, a relatively large sample surface of up to 1.5 mm in diameter with a typical magnification of 5-fold to 10-fold must be imaged. The field curvature is a considerable nuisance because it makes the edge regions very blurred on the flat viewing surface.

The exit pupil of such a Cassegrain objective coincides with the aperture and is located in the center of curvature of the two mirrors. Rays from the edge of the field of view will therefore diverge more and more behind the image. This results in excessive vignetting through the following optical system if the latter is not dimensioned disproportionately large.

According to the invention, both problems are corrected simultaneously with one compact element. This is done with a Mangin mirror that is located in the immediate vicinity of an intermediate image (intermediate focus). It can act as a 'field lens' in this position. Its refractivity is chosen such that the exit pupil of the optical system in front of it is imaged into the entrance pupil of the following optical system and vignetting is thus avoided. At the same time, its Petzval radius is chosen such that it just about corrects the Petzval radius of the remaining optical system. The greatest proportion thereof originates from the Cassegrain objective so that the Mangin mirror must have a Petzval radius of approximately $+f_{Obj}$.

A Mangin mirror is a meniscus lens with a reflective rear surface. The two curvature radii R1 and R2 are negative (with the usual sign convention).

Let a:=R2/R1 (a is always greater than 1).

Let the distance of the apexes of the two spherical surfaces be t and the refractive index of the glass used be n.

For the Petzval sum ($=1/R_{Petzval}$) of k spherical surfaces with curvature radii $R_i$, the following generally applies (neglecting the astigmatism):

$$1/R_{Petzval} = -n_{k+1}\sum_{i=1}^{k}\frac{(n_{i+1}-n_i)}{(R_i n_i n_{i+1})}$$

where $n_i$ is the refractive index in front of and $n_{i+1}$ is that behind the i-th surface.

For the three surfaces that are passed through on passage of light through the Mangin mirror, the following results:

$$1/R_{Petzval} = -(n-1)/(n\,R1) - 2/(n\,a\,R1) + (1-n)/(n\,R1)$$
$$= -(2a(n-1)+2)/(n\,a\,R1)$$

The Petzval radius of the Mangin mirror is therefore:

$$R_{Petzval} = +n a |R1|/(2a(n-1)+2)$$

It is independent of the thickness t of the element. The expression $$na/(2a(n-1)+2)$$

is in the range 0.5 . . . 2 for meaningful values of n and a, so that the magnitude of the required curvature radius R1 is similar in size to the focal distance of the Cassegrain objective.

The refractivity D of the Mangin mirror can only be stated as a simple formula with negligible thickness (t 0):

$$D = (n-1)/R1 - (2n)/(aR1) + (n-1)/R1 = (2a(n-1)-2n)/(aR1)$$

The focal distance of a Mangin mirror (with thickness t 0) for the reflected radiation is:

$$f_{Mangin} = -1/D = +a|R1|/(2a(n-1)-2n)$$

This focal distance must (with the usual sign convention) be negative to have a focusing effect for the radiation reflected by the mirror. That is the case if a is chosen as follows:

$$a < n/(n-1)$$

If a is close to $n/(n-1)$, large focal distances can also be implemented. As can be ascertained by ray tracing, with increasing thickness t of the element, the refractivity D also increases (becomes more positive). The focal distance therefore becomes shorter and shorter (i.e. it has a stronger focusing effect). By varying the thickness t, it is therefore possible to achieve fine adjustment of the necessary focal distance of the 'field lens' without influencing the correction of the field curvature. The thickness must be chosen such that a Mangin mirror can be manufactured that is robust but does not produce an excessive chromatic aberration.

Preferred Configuration:

The back focal plane of the Cassegrain objective is imaged via an Offner objective into a further intermediate image of the same size. The Offner objective produces practically no additional aberrations, and the field curvature also remains unaffected. The Mangin mirror is now placed into this intermediate image. In practice, the mirror surface should be displaced slightly out of the focus to avoid sharp imaging of any surface scratches or flaws of the Mangin mirror in the final image. The reflected beam is deflected through 90 degrees (for example, using a 50:50 beam splitter) to be imaged via two achromatic lenses into the final image plane (e.g. CCD camera).

Dimensioned Example:

The Cassegrain objective has a focal distance of 19 mm and 8-fold magnification. Its Petzval radius is then −19 mm. The further optical system as far as the CCD camera (that is, essentially the two achromatic lenses) amplifies the field curvature up to $R_{Petzval} = -15$ mm. The Offner objective has a primary mirror with a radius −180 mm. The two achromatic lenses have focal distances 150 mm and 75 mm to achieve the necessary reduction (0.5 times) of the originally 12 mm image on the CCD surface. By means of ray tracing, the position of the exit pupil behind the Offner objective is determined: In this special configuration, it is just behind the primary mirror after the latter has been passed through for the second time. The distance from there to the Mangin mirror is 140 mm. For the latter to act as a 'field lens,' it must produce an image of the pupil at the location of the first achromatic lens, that is, have a focal distance of −72 mm. To correct the field curvature, it must also have a Petzval radius of +15 mm. Because the magnitude of the focal distance is clearly greater than the Petzval radius, a (=R2/R1) must be chosen a little smaller than $n/(n-1)$. For a glass with n=1.5, a<3 must apply, for example a=2.5 is chosen. According to the formula, the desired Petzval radius is achieved for a front surface radius of R1=−18 mm. For a thickness t=0, the focal distance of the Mangin mirror according to the formula $f_{Mangin} = -90$ mm. By means of ray tracing, the desired target focal distance of −72 mm for a thickness of t=1.85 mm is obtained. If the thickness is too small to permit mechanically stable implementation, a new calculation can be performed with a glass with a greater refractive index. The mechanical diameter of the Mangin mirror must be a little more than the intermediate image size; a typical diameter is 20 mm.

All the formulas stated are paraxial approximations. Before final dimensioning of the Mangin mirror, it is therefore advisable first to optimize the calculated values by means of ray tracing, optimizing for sharpness and even illumination of the final image.

We claim:

1. An infrared (=IR) microscope, the microscope comprising;
    elements defining a beam path for visible light;
    elements defining a beam path for IR light;
    a first intermediate focus;
    a Cassegrain objective having a sample position, said Cassegrain objective imaging the sample position onto said first intermediate focus, wherein said beam paths for visible and for IR light are coextensive in a region of the sample position;
    an IR detector, wherein the IR microscope is constituted such that, at least in an IR viewing mode, IR light is directed from said first intermediate focus to said IR detector;
    a second intermediate focus, wherein the IR microscope is constituted such that, in the beam path for visible light, said first intermediate focus is imaged onto said second intermediate focus;
    a Mangin mirror disposed at said second intermediate focus, said Mangin mirror being structured to correct a field curvature of said Cassegrain objective; and
    a flat viewing surface disposed downstream of said Mangin mirror, wherein, at least in an optical viewing mode and in the beam path for visible light, said first intermediate focus is imaged onto said flat viewing surface, wherein a curvature radius R1 of a front surface of said Mangin mirror, a curvature radius R2 of a reflective rear surface of said Mangin mirror, a refractive index n of a refractive material between said front and said rear surfaces of said Mangin mirror and a thickness t of said Mangin mirror are chosen such that not only said field curvature is corrected but an image field on said flat viewing surface is also free of vignetting.

2. The IR microscope of claim 1, wherein said flat viewing surface is a detector surface of a camera.

3. The IR microscope of claim 1, wherein, in the beam path for visible light, said Mangin mirror images an exit pupil of an optical system in front of said Mangin mirror onto an entrance pupil of an optical system behind said Mangin mirror.

4. The IR microscope of claim 3, wherein said optical system in front of said Mangin mirror is an Offner objective and said optical system behind of said Mangin mirror is an achromatic lens.

5. The IR microscope of claim 1, wherein $a<n/(n-1)$ applies, where $a=R2/R1$.

6. The IR microscope of claim 1, wherein said curvature radius R1 of a front surface of the Mangin mirror, said curvature radius R2 of a reflective rear surface of the Mangin mirror and said refractive index n of said refractive material between said front and rear surfaces of said Mangin mirror are chosen such that a Petzval radius $R_{Petzval}$ of said Mangin mirror is at least essentially diametrically opposed with respect to a Petzval radius $R_{Petzval}^{VIS}$ in the beam path for visible light, including said Cassegrain objective and without said Mangin mirror, where $R_{Petzval}=+na|R1|/[2a(n-1)+2]$
and $a=R2/R1$,
wherein said Cassegrain objective introduces a Petzval radius $R_{Petzval}^{Obj}$ of $-f_{Obj}$ into said Petzval radius $R_{Petzval}^{VIS}$ in the beam path for visible light, $f_{Obj}$ being a focal distance of said Cassegrain objective.

7. The IR microscope of claim 1, wherein $0.5*f_{Obj} \leq |R1| \leq 2*f_{Obj}$ applies, where $f_{Obj}$ is a focal distance of said Cassegrain objective and R1 is a curvature radius of a front surface of said Mangin mirror.

8. The IR microscope of claim 1, wherein an Offner objective is disposed in the beam path for visible light between said first intermediate focus and said second intermediate focus.

9. The IR microscope of claim 1, wherein a beam splitter is provided in the beam path for visible light to split incident and reflected light at said Mangin mirror.

10. The IR microscope of claim 1, wherein the IR microscope is constituted for operation with reflection and/or transmission.

11. The IR microscope of claim 1, further comprising an interferometer that is integrated into a housing of the IR microscope.

12. The IR microscope of claim 1, further comprising a lens system to image said second intermediate focus onto said flat viewing surface.

13. The IR microscope of claim 12, wherein said lens system comprises two achromatic lenses.

14. The IR microscope of claim 1, further comprising a variable aperture for IR light disposed at said first intermediate focus.

* * * * *